United States Patent [19]

Nolen

[11] Patent Number: 5,555,873
[45] Date of Patent: Sep. 17, 1996

[54] FUEL TANK SWITCHING APPARATUS

[76] Inventor: Jay A. Nolen, P.O. Box 9241, Evansville, Ind. 47724-7241

[21] Appl. No.: 389,394
[22] Filed: Feb. 16, 1995
[51] Int. Cl.⁶ ................................................. F02B 13/00
[52] U.S. Cl. ..................... 123/575; 123/576; 137/255; 137/267
[58] Field of Search ................................. 123/575, 576; 137/255, 267

[56] References Cited

U.S. PATENT DOCUMENTS

| | | |
|---|---|---|
| 2,984,229 | 5/1961 | Vaughan . |
| 3,981,321 | 9/1976 | Risse et al. . |
| 4,287,907 | 9/1981 | Worthy . |
| 4,306,579 | 12/1981 | Kelly . |
| 4,402,296 | 9/1983 | Schwarz ................................. 123/576 |
| 4,463,734 | 8/1984 | Akeroyd . |
| 4,911,116 | 3/1990 | Prohaska et al. ..................... 123/576 |
| 5,092,305 | 3/1992 | King ..................................... 123/575 |
| 5,163,466 | 11/1992 | Moody . |
| 5,197,443 | 3/1993 | Hodgkins . |
| 5,327,865 | 7/1994 | Riehemann . |
| 5,336,396 | 8/1994 | Shetley ................................. 123/575 |

Primary Examiner—Erick R. Solis
Attorney, Agent, or Firm—Richard C. Litman

[57] ABSTRACT

A fuel tank switching apparatus provides for the automatic switching of fuel delivery systems from a tank or tanks containing fuel which is taxed, to an auxiliary tank which stores untaxed fuel therein. The apparatus is particularly adapted for use in large, over the road diesel powered semi trucks, but may be adapted to other types of motor vehicles as well. The apparatus automatically transfers fuel delivery and return to the auxiliary fuel tank whenever the parking brake is applied, which action will only occur when the truck or vehicle is parked, or possibly in very rare emergency situations. As both the parking brake annunciator (light or audible device) and the pneumatic pressure system are independent of the primary service brake system in large vehicles, the apparatus receives a signal from the parking brake system to switch tanks automatically with no intervention required or allowed by the driver or operator. The system may also provide for automatic switching back to the main fuel system, and notification to the vehicle operator, in the event the auxiliary fuel system is depleted.

20 Claims, 1 Drawing Sheet

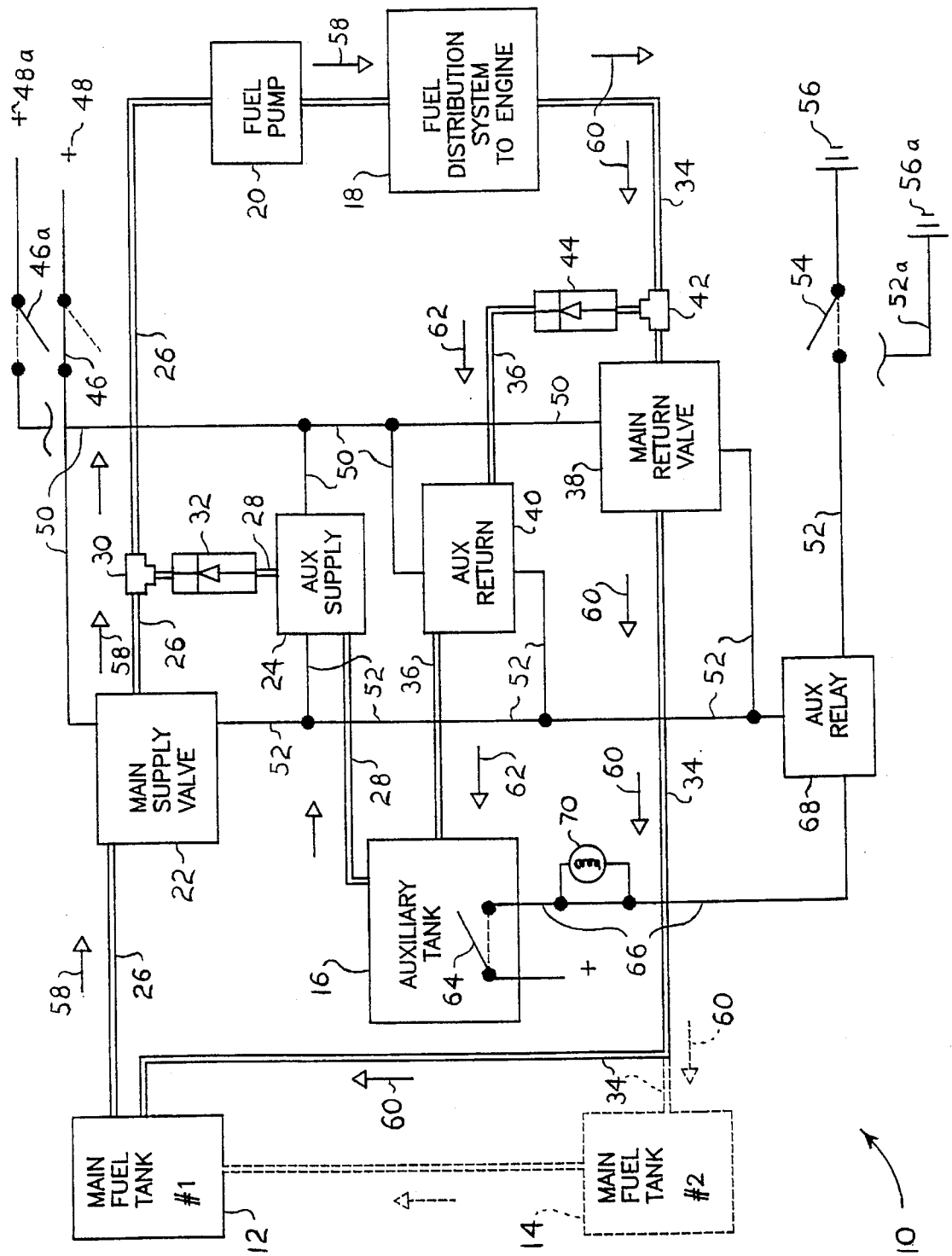

FUEL TANK SWITCHING APPARATUS

FIELD OF THE INVENTION

The present invention relates generally to multiple fuel tank systems for motor vehicles, and more specifically to an automatic switching system providing for the use of non-taxed fuel supplied from an auxiliary fuel tank when the vehicle is parked off road. The apparatus is particularly adaptable to large, over the road diesel powered semi trucks and vans, which spend a large percentage of their time with the engine running at idle while parked.

BACKGROUND OF THE INVENTION

Commercial motor vehicles, particularly large diesel powered semi trucks, are taxed relatively heavily for their operation on public roads. Annual registration and licensing fees are considerably more than those typically charged to the owners and operators of privately owned passenger cars and vehicles, but fuel taxes are the major means of tax revenue from such large trucks.

At the time of preparation of the present disclosure, diesel fuel for highway use was Federally taxed at a rate of 24.4 cents per gallon, with additional state taxes averaging around another 20 cents per gallon, depending upon the state where the fuel was sold. Thus, Federal and state taxes alone account for approximately one third or more of the cost of such diesel fuel. Yet, not all such fuel is burned on public roads and highways. Trucks commonly spend a large percentage of their time while parked with their engines running at idle, due to the relative difficulty in starting large diesel engines, particularly when cold; studies have found that trucks may average eight hours per day parked with the engine idling.

It is generally more economical in the long run to allow such an engine to run at idle, where it is burning on the order of one gallon of fuel per hour, than to shut it down and restart it later, which results in wear and tear on the starter system, cold start abrasion of particularly the upper cylinder walls due to lack of lubrication at startup, and other adverse factors. Indeed, in extremely cold conditions, it is common to allow such engines to run continuously to provide heat to the fuel, which can increase in viscosity to the point of becoming a gel in extremely cold conditions, and also to the trucks cab.

However, such idling while parked will typically cost the operator of the truck on the order of 40 to 45 cents per hour just in terms of fuel taxes, at the typical fuel burn of one gallon per hour at idle. While it is legally required that motor vehicle operators pay taxes on fuels used in transportation on public roads, thereby providing for their construction, maintenance, and repair, there is no legal requirement for such taxes to be paid on fuels which are not used on public roads. Thus, the typical truck could see savings of over three dollars per day in typical use, just by burning untaxed fuel while parked with the engine at idle.

Accordingly, a need will be seen for an apparatus or system which provides for the automatic switching of the fuel system from a fuel tank containing taxed fuel, to an auxiliary fuel tank containing untaxed fuel, while the motor vehicle is parked. The system must be fully automatic in operation and beyond control of the operator, to ensure that the less expensive untaxed fuel will always be used where legally permissible, and further to ensure that only taxed fuel will be burned in over the road use while traveling on public roads, streets, and highways.

DESCRIPTION OF THE PRIOR ART

U.S. Pat. No. 2,984,229 issued to Paul S. Vaughan on May 16, 1961 describes a Multi-Fuel Supply System adapted to provide different grades or weights of diesel fuel to an engine at different times, depending upon the load demanded of the engine. A spring loaded spool valve is actuated by a manually operated valve "under control of the engine operator" (col. 4, lines 6–7) supplying air pressure (i.e., from the air pump powered by the engine and providing pressure for the vehicle air brakes) to force the valve to a position providing heavier fuel to the engine during engine operation, as desired. The relatively light grade of fuel does not have the higher viscosity of the heavier fuel, and thus flows more easily. Accordingly, the Vaughan patent also provides for a fuel heater for the heavier fuel, and a temperature sensor to preclude operation of the pneumatic valve before the heavier fuel is up to the proper temperature. The present invention, on the other hand, is entirely automatic in nature, does not differentiate between different grades of fuel, and further does not rely upon or require any pneumatic means for operation of the electrically powered solenoid valves of the system, although the present system may use a pneumatically actuated electrical switch to close an electrical circuit from the electrically operated solenoid valves.

U.S. Pat. No. 3,981,321 issued to John T. Risse et al. on Sep. 21, 1976 describes a Vehicle Fuel System wherein both the delivery line and the return line from each of plural tanks are teed to provide even delivery and return from and to each tank. The above described system is not acceptable in the intended environment of the present invention, as rigid separation of taxed and untaxed fuel in different tanks must be provided.

U.S. Pat. No. 4,287,907 issued to Howard G. Worthy on Sep. 8, 1981 describes a Fuel Feeding System For Aircraft which provides annunciator lights to notify the flight crew of the tank selected and being used. Further warnings are provided in the event of depletion of fuel from a selected tank, but in each case the fuel selector valve must be operated manually by the flight crew; no automatic operation is provided, as with the present fuel tank switching system.

U.S. Pat. No. 4,306,579 issued to Michael J. Kelly on Dec. 22, 1981 describes a Multi-Tank Fuel Control System having plural tanks feeding to a common reservoir, from which the engine draws fuel. Warning means are provided to alert the operator to the need to switch tanks, but the actual switching operation is manual, as with the Worthy patent discussed immediately above.

U.S. Pat. No. 4,463,734 issued to Richard T. Akeroyd on Aug. 7, 1984 describes a Dual Fuel Diesel Engine wherein the two fuels are mixed in varying percentages depending upon the load on the engine. While the system is fully automatic and requires no input or control from the operator, it mixes the two fuels together, which action is not suitable in the environment of the present invention, where the two fuels (taxed and non-taxed) must be strictly separated at all times in order to assure legal operation.

U.S. Pat. No. 5,163,466 issued to Warren L. Moody on Nov. 17, 1992 describes a Dual-Tank Fuel Utilization System incorporating a single valve having multiple inlet and outlet paths to provide for fuel flow therethrough from plural tanks. Automatic switching means is discussed, but such means relies upon fuel quantity indicators in each tank to cause the valve to switch tanks automatically. Such operation is not dependent upon the actuation or deactivation of other systems (e.g., emergency or parking brake system) of the vehicle, as in the present invention, and hence cannot be used to legally switch the operation of the vehicle to taxed fuel when operating on the road, as provided by the present switching apparatus.

U.S. Pat. No. 5,197,443 issued to David H. Hodgkins on Mar. 30, 1993 discloses a Fuel System For Diesel Truck incorporating a temperature sensor which automatically directs return fuel to a given tank depending upon its temperature. However, fuel is drawn from only one tank of the system, as the plural tanks are interconnected. Thus, the Hodgkins system cannot be used to supply untaxed fuel, as there is no provision to assure that such untaxed fuel would not be used on the road, as provided by the present invention.

Finally, U.S. Pat. No. 5,327,865 issued to Thomas Riehemann on Jul. 12, 1994 describes a Control System For An Internal Combustion Engine In A Motor Vehicle incorporating electrical or electronic means for controlling the engine output from the throttle or accelerator pedal. No tank switching means is disclosed, and in any case the operation requires command input from the operator in order to cause the slave components to operate, rather than being fully automatic and requiring no input from the operator, as in the present fuel tank switching apparatus. No relationship is seen to the present invention.

None of the above noted patents, taken either singly or in combination, are seen to disclose the specific arrangement of concepts disclosed by the present invention.

SUMMARY OF THE INVENTION

By the present invention, an improved fuel tank switching apparatus for motor vehicles is disclosed.

Accordingly, one of the objects of the present invention is to provide an improved fuel tank switching apparatus which is particularly adapted for use in large, over the road diesel powered trucks, but which may be adapted to other motor vehicles as well.

Another of the objects of the present invention is to provide an improved fuel tank switching apparatus which automatically switches fuel delivery from one tank or set of tanks providing for the storage of taxed fuel for over the road use, to an auxiliary tank adapted for the storage of non-taxed fuel, without intervention on the part of the vehicle driver or operator, and which system completely removes all direct control of such switching from the driver or operator.

Yet another of the objects of the present invention is to provide an improved fuel tank switching apparatus which is automatically controlled by application of the parking brake of the vehicle.

Still another of the objects of the present invention is to provide an improved fuel tank switching apparatus which precludes any mixing of fuels between tanks or tank systems containing taxed and untaxed fuels.

A further object of the present invention is to provide an improved fuel tank switching apparatus which may provide automatic switching to use taxed fuel from the main fuel tank array, and notification thereof to the vehicle driver or operator, in the event the auxiliary fuel tank containing non-taxed fuel is depleted.

An additional object of the present invention is to provide an improved fuel tank switching apparatus which may be electrically energized by automatic electrical or pneumatic switching means.

A final object of the present invention is to provide an improved fuel tank switching apparatus for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the single attached drawing figure.

BRIEF DESCRIPTION OF THE DRAWING

The single drawing FIGURE is a schematic diagram of the fuel delivery and return system and electrical system of the present fuel tank switching apparatus.

Similar reference characters denote corresponding features consistently throughout the single attached drawing FIGURE.

DETAILED DESCRIPTION OF THE PREFERRED EMBODIMENT

Referring now to the drawing, the present invention will be seen to relate to a fuel tank switching apparatus 10, which apparatus is particularly adapted for use in large, diesel powered over the road semi trucks, but which will be seen to be of value in other types of vehicles as well. The present apparatus or system 10 serves to switch fuel delivery tanks automatically to provide for use of untaxed fuel when the vehicle is parked, thereby providing significant economies of operation over a period of time.

The present fuel tank switching apparatus 10 essentially comprises at least one main fuel tank 12 (or plural tanks, as indicated by the second tank 14 shown in broken lines), at least one auxiliary fuel tank 16, and appropriate supply lines, switching means, and other components. Normally, fuel is supplied from the main tank or tanks 12/14 to the engine fuel distribution system 18 (e.g., fuel injection system, although the present apparatus 10 is also adaptable to a carbureted engine) by means of an electrically or mechanically powered fuel pump 20. (It will be understood that the present system may incorporate additional conventional components, such as fuel filters, pressure regulators, etc., which are generally a part of any fuel system and hence are not shown specifically in the present disclosure.)

Switching between the main fuel tank(s) 12/14 and the auxiliary fuel tank 16 is accomplished automatically by a normally open main fuel supply valve 22 and a normally closed auxiliary fuel supply valve 24. These two valves 22 and 24 are preferably electrically operated solenoid valves, with actuation being accomplished by closure of an electrical circuit described further below. The main supply valve 22 is connected in the main fuel delivery line 26 between the main fuel tank(s) 12/14 and the engine fuel distribution system 18, and is normally open when no electrical power is supplied thereto.

The auxiliary fuel supply valve 24 is connected in an auxiliary fuel delivery line 28, running between the auxiliary fuel tank 16 and a tee fitting 30 connected to the main fuel delivery line 26 immediately downstream from the main fuel supply valve 22; a check valve 32 may be included in the auxiliary fuel delivery line 28, to allow fuel to flow only in the direction from the auxiliary fuel tank 16 to the main fuel delivery line 26, and to block any reverse flow from the main fuel delivery line 26 back into the auxiliary fuel delivery line 28 and auxiliary fuel tank 16. (The main fuel supply valve 22 is closed when the auxiliary fuel supply valve 24 is open, thereby precluding flow from the auxiliary fuel delivery line 28 back into the main fuel tank(s) 12/14.) The auxiliary fuel supply valve 24 is normally closed when no electrical power is applied thereto, and is only opened when the circuit supplying electrical power to the valve 24 is completed.

The present apparatus 10 is particularly adaptable for use in large, over the road diesel powered trucks, although it may be readily adapted to other types of vehicles. Such diesel powered vehicles use fuel injection systems as the engine fuel distribution means, and accordingly include fuel return lines providing for the return of excess fuel from the injection system back to the fuel tank(s). The present invention provides for such fuel return lines 34, extending between the fuel distribution system 18 and back to the main fuel tank(s) 12/14. If fuel is drawn from the auxiliary fuel tank system 16, a separate auxiliary fuel return line 36 must also be provided, along with appropriate main fuel and auxiliary fuel return valves 38 and 40. A tee fitting 42, similar to the tee 30 in the supply or delivery lines 26 and 28, is installed preferably immediately upstream of the main fuel return valve 38 to route fuel to the main return valve 38 or the auxiliary return valve 40, according to which of the valves 38 or 40 is open at the time. A check valve 44 may also be provided in the auxiliary fuel return line 36, to preclude flow from the auxiliary return line 36 back to the main return line 34, and functions similarly to the check valve 32 in the delivery side of the system.

The present fuel tank switching apparatus 10 is intended to supply fuel from the main tank(s) 12/14 to the engine fuel distribution system 18, and also to provide for return fuel back to the tank(s) 12/14 as required, when the engine is providing a relatively high amount of power and burning a relatively high amount of fuel (typically from a few gallons up to twenty gallons per hour or more). On the other hand, the auxiliary fuel supply and return systems are intended to supply fuel to the engine only when the engine is at idle power, or at least burning a very low amount of fuel (on the order of one gallon per hour).

Accordingly, it will be seen that the auxiliary fuel supply and return solenoid valves 24 and 40 are smaller than the main fuel supply and return solenoid valves 22 and 38; this is shown schematically in the drawing figure. In fact, it is preferred that the auxiliary fuel supply and return valves 24 and 40 be relatively small, in order to limit fuel flow therethrough to preclude the development of substantial power when running the engine on the auxiliary fuel system; it is intended that the auxiliary fuel system be used only when the vehicle is parked, to preclude need for restarting and/or to operate accessories, rather than when the engine is providing substantial motive power to the vehicle.

It will further be noted that the schematic drawing figure shows the four solenoid valves 22, 24, 38, and 40 as separate units. While they may be combined into a single housing, the physical separation of these valves provides for more economical replacement of individual valves as may be required from time to time, rather than a need to repair or replace an entire relatively complex single valve body or housing containing all of the above valves as a single unit.

The above described solenoid valves 22, 24, 38, and 40 preferably receive electrical power from a source which is always on when the vehicle engine is operating (e.g., an ignition switch in an engine having electrical ignition, or equivalent control switch in a diesel powered vehicle). Such a normally closed switch 46 is shown schematically in the drawing figure, and receives electrical power from an electrical source (battery, alternator, etc.) indicated as the "+" symbol 48. The various solenoid valves 22, 24, 38 and 40 are electrically connected to the switch 46 by an electrical trunk line and/or branches 50, and thence to an electrical ground line and/or branches 52, thus defining a parallel electrical circuit for the electrically operated solenoid valves 22, 24, 38, and 40. (It will be understood that a relatively small electrical current may be used to trigger the solenoid valves 24, 38, and 40 by means of electrical relays, not shown.)

The ground side 52 of the above described electrical circuit is preferably connected to a normally open electropneumatic switch 54, and thence to a ground connection 56 to complete the circuit. The above described circuit, with its normally closed electrical power switch 46 and normally open pneumatically actuated switch 54, is particularly adapted to use in vehicles having air brakes. Conventionally, the brakes in such vehicles have springs which urge them to an actuated (braking) position, with the release position maintained by air pressure acting against the springs. Thus, if the air pressure system fails, the brakes will automatically be applied. Also, such air brake systems conventionally have a separate air delivery line system for the emergency or parking brakes and the normal service brakes, for redundancy in the event of failure of one of the two separate air delivery line systems.

The present fuel tank switching apparatus makes advantageous use of such a conventional separate pneumatic or air system for the emergency or parking brakes, by connecting the ground side 52 of the electrical circuit for the valves 22, 24, 38, and 40 to an electropneumatic switch 54, which is normally open so long as normal (higher than ambient) air pressure is maintained in the braking system. However, when the emergency/parking brakes are applied, the air pressure in the system drops to ambient, thereby releasing the brake springs to hold the brakes in the applied position. Simultaneously with the above action, the pneumatic switch 54 closes its contacts, thereby completing the electrical circuit from the electrical power source 48, through the normally closed switch 46 (and any relays, not shown) to actuate the solenoid fuel control valves 22, 24,38, and 40, and thence to ground 56 through the closed contacts of the pneumatically actuated switch 54.

Alternatively, the valves 22, 24, 38, and 40 may be connected directly to a ground source, as indicated by the alternative ground path 52a and ground source 56a, thereby eliminating the need for a separate switch to close the circuit. It will be seen that such a circuit would supply continuous power to the valves 22, 24, 38, and 40, thus providing continuous operation of the engine from the auxiliary fuel tank 16, unless another switching means is provided. Such a control switch 46a may be provided by connecting the valves 22, 24, 38, and 40 to a conventional normally open emergency or parking brake electrical warning light, buzzer, etc. (preferably by means of relays, not shown), drawing power from a source 48a. Thus, the present fuel tank switching apparatus 10 may be used with vehicles having other than air brake systems, if desired.

The present fuel tank switching apparatus thus provides for the fully automatic switching of fuel delivery from the standard tank or tanks 12/14, to an auxiliary fuel tank 16, whenever the vehicle emergency or parking brake is applied. No intervention on the part of the vehicle operator is required, and in fact none is possible, as the system is fully automated and beyond the control of the driver or operator. This is an important consideration, as it is intended that the auxiliary fuel tank 16 be supplied with fuel for which no tax has been paid (or at least fuel for which any tax which has been paid, is refunded in accordance with tax refund provisions for fuel used for off road purposes). As the vehicle parking brake is by definition only applied when the vehicle is parked and not in operation on the road surface, the present fuel tank switching apparatus 10 provides fully automated and legal means for the use of such non-taxed fuel, automatically switching to taxed fuel from the main supply tank(s) 12/14 when the parking brake is released. As many large trucks spend a relatively large percentage of their time at idle (at truck stops, refueling stops, loading and unloading, rest stops to supply heat or air conditioning to the cab, etc.), the present apparatus 10 will be seen to provide significant savings in fuel tax costs which would otherwise be paid unnecessarily by the operator.

A typical cycle of operation is as follows: The vehicle is operating on the road, with the emergency and parking brake system released, i.e., the brakes are off to allow the vehicle to roll for normal operation. The pneumatically actuated switch 54, and/or the parking brake warning switch 46a, is accordingly open, with the electrical circuit 50/52 correspondingly being open and supplying no electrical power to the fuel control valves 22, 24, 38, and 40.

As the main supply and return valves 22 and 38 are normally open when not electrically actuated, they will provide for fuel delivery from the main fuel tank(s) 12/14, through the main fuel delivery lines 26 (as indicated by the main fuel delivery directional arrows 58), to the fuel pump 20 and engine fuel distribution system 18, thence returning any unused fuel back to the main fuel tank(s) 12/14 via the main fuel return lines 34 and the open main fuel return valve 38 (as indicated by the main fuel return directional arrows 60). The auxiliary fuel supply and auxiliary fuel return valves 24 and 40 operate in the opposite manner of that of the main fuel supply and return valves 22 and 38 discussed above, in that the two auxiliary valves 24 and 40 are normally closed when no electrical power is provided to them, thus precluding fuel flow from the auxiliary tank 16 through any of the system when the parking brake is released and the electrical circuit is open.

When the vehicle pulls into a truck stop, rest area, or is otherwise taken from the road and parked, the parking brake is applied, which (with an air brake or pneumatic system) releases air from the parking brake lines, allowing the normally open pneumatic switch 54 to closer thereby providing electrical power to the solenoid valves 22, 24, 38, and 40 from the normally closed switch 46. Alternatively, a parking brake with an electrical brake actuation warning means (light, buzzer, etc.), actuated by a normally open switch 46a which is closed only when the parking brake is applied, may be wired directly to a ground source 56a to provide a closed circuit when the parking brake is applied.

Whichever means is used, the result is that electrical power is applied to the valves 22, 24, 38, and 40, resulting in the closure of the main fuel supply and return valves 22 and 38, and the opening of the auxiliary fuel supply and return valves 24 and 40. Fuel is thus drawn by the fuel pump 20 from the auxiliary fuel tank system 16, through the auxiliary fuel delivery line 28 and the open auxiliary fuel supply valve 24, to connect to the main fuel supply line 26 downstream of the closed main fuel supply valve 22 at the tee connection 30. If an injection system is used which requires the return of unused fuel to the tank, the fuel is initially routed via the common main fuel and auxiliary fuel return line from the fuel distribution system 18, to the tee connection 42 therein and thence through the open auxiliary fuel return valve 40 by means of the auxiliary fuel return line 36, as indicated by the auxiliary fuel return directional arrows 62. Auxiliary fuel cannot pass to the main fuel tank(s) 12/14, as the main return valve 38 is closed when the auxiliary fuel valves 24 and 38 are open.

As the above system is completely automated and precludes intervention by the vehicle operator, it will be seen that preferably some means is provided to operate the system (or at least to notify the operator) when the auxiliary fuel tank system 16 is depleted of fuel. A fuel quantity indicator (not shown) may be installed in the auxiliary tank system 16, but the present switching apparatus 10 provides further convenience by providing a normally open low fuel quantity switch 64 within the auxiliary tank 16, which is closed when the auxiliary fuel is depleted. The closed low auxiliary fuel switch 64 closes an electrical circuit 66 to open a normally closed auxiliary relay 68, which breaks the otherwise closed electrical circuit 50 and 52 providing power to close the main supply and return valves 22 and 38, and open the auxiliary supply and return valves 24 and 40. Thus, when the ground side 52 of the solenoid valve electrical circuit is opened by triggering the opening of the normally closed auxiliary relay 68, the operation of the present apparatus will revert to its normal condition, with the main fuel valves 22 and 38 being opened and the auxiliary fuel valves 24 and 40 being closed. This will result in fuel being drawn from the main tank system 12/14 rather than the (depleted) auxiliary fuel tank system 16, even though the vehicle is parked off road and the emergency or parking brake has been applied to close the switches 54 or 46a.

The above described depleted auxiliary fuel tank switching means 64 through 68 will thus provide for the uninterrupted operation of the vehicle engine from the main (taxed) fuel tank(s) 12/14, even though the use of taxed fuel from the main tank(s) 12/14 is not legally required under such conditions. At least the vehicle engine will remain in operation, with any engine driven accessories continuing to operate as required. The present apparatus 10 may also be used in refrigerated trucks to power a separate engine driving the refrigeration system of the trailer or van box. As such units are not directly being used for motive power for the vehicle, the use of untaxed fuel is permissible. It is extremely critical that such refrigeration units be in continuous operation to preclude damage to heat sensitive goods, and thus the automatic switching of fuel systems from a depleted auxiliary (untaxed) fuel tank system 16 to the primary vehicle fuel tank(s) 12/14, is essential to assure uninterrupted power to such units. A warning means (light 70, buzzer, etc.) may be provided to signal the depletion of the auxiliary tank 16, if desired.

In summary, the present fuel tank switching apparatus 10 will be seen to provide a completely automated system providing for the automatic transfer of fuel delivery from a vehicle tank system containing taxed fuel for over the road use, to an auxiliary tank system containing untaxed fuel. The automated switching system will only operate when the vehicle parking or emergency brake is actuated, and automatically switches back to the main or primary fuel supply system when the emergency or parking brakes are released. The present system thus ensures completely legal operation of the vehicle, using untaxed fuel only while the vehicle is parked, and in fact draws upon the primary (taxed) fuel system even during off road maneuvering before and after parking, loading, etc., to assure complete use of any untaxed fuel in the main fuel supply lines immediately after release of the parking brakes.

As the typical large, diesel powered semi truck will use about one gallon of fuel per hour at idle, and typically sits at idle an average of eight hours per day in at least some circumstances, it will be see that installation and use of the present fuel tank switching apparatus 10 in such a truck will result in a tax savings of a few dollars per day, at the Federal and typical state fuel taxes on such fuels. Thus, in a relatively short period of time, the present apparatus 10 will pay for itself when installed in such a large truck. Moreover, the present apparatus is adaptable to both fuel injected and carbureted engines, and to vehicles having either pneumatic or conventional parking brake systems, to provide greater versatility for virtually any motor vehicle.

It is to be understood that the present invention is not limited to the sole embodiment described above, but encompasses any and all embodiments within the scope of the following claims.

I claim:

1. A fuel tank switching apparatus for a motor vehicle, with the motor vehicle including at least a main fuel tank system, an engine fuel distribution system, and a parking brake system, said fuel tank switching apparatus comprising:

at least a main fuel supply valve providing for primary fuel supply from the main fuel tank system to the engine fuel distribution system of the motor vehicle, an auxiliary fuel tank system, and an auxiliary fuel supply valve providing auxiliary fuel supply from said auxiliary fuel tank system to the engine fuel distribution system of the motor vehicle, and;

automatic switching means communicating with said main fuel supply valve and said auxiliary fuel supply valve and controlled by operation of the vehicle parking brake system, with said automatic switching means closing said main fuel supply valve and opening said auxiliary fuel supply valve when the parking brake is applied, thereby causing stoppage of fuel delivery from the main fuel tank system and simultaneous initiation of fuel delivery from said auxiliary fuel tank system, and further opening said main fuel supply valve and closing said auxiliary fuel supply valve when the parking brake is released, thereby causing stoppage of fuel delivery from said auxiliary fuel tank system and simultaneous initiation of fuel delivery from the main fuel tank system of the motor vehicle, whereby;

switching from the main fuel tank system to said auxiliary fuel tank system of the motor vehicle is accomplished automatically without intervention of a vehicle operator when the vehicle parking brake is applied, and reversed when the vehicle parking brake is released.

2. The fuel tank switching apparatus of claim 1 including:

a main fuel return valve providing for return of unused primary fuel from the engine fuel distribution system to the main fuel tank system, and an auxiliary fuel return valve providing for return of unused auxiliary fuel from the engine fuel distribution system to said auxiliary fuel tank system.

3. The fuel tank switching apparatus of claim 2 wherein:

said main fuel supply valve, auxiliary fuel supply valve, main fuel return valve, and auxiliary fuel return valve are each physically separate from one another.

4. The fuel tank switching apparatus of claim 2 wherein:

said main fuel supply valve and said main fuel return valve each respectively have a larger capacity than said auxiliary fuel supply valve and said auxiliary fuel return valve, whereby fuel flow rate through said auxiliary fuel supply valve and said auxiliary fuel return valve is limited to supply sufficient fuel flow only for low power conditions.

5. The fuel tank switching apparatus of claim 2 including:

check valves precluding fuel flow from the main fuel tank system to said auxiliary fuel tank system, and from said auxiliary fuel tank system to the main fuel tank system of the vehicle.

6. The fuel tank switching apparatus of claim 1 wherein the motor vehicle parking brake system is pneumatically operated, said fuel tank switching apparatus including:

a pneumatic switch communicating pneumatically with the vehicle parking brake system and electrically with at least said main fuel supply valve and said auxiliary fuel supply valve;

at least said main fuel supply valve being closed when electrical power is applied thereto, at least said auxiliary fuel supply valve being opened when electrical power is applied thereto, and said pneumatic switch being closed when air pressure is released from the vehicle parking brake system to apply the vehicle parking brakes, and;

said automatic switching means comprising an electrical circuit supplying electrical power to at least said main fuel supply valve, said auxiliary fuel supply valve, and said pneumatic switch, whereby;

said main fuel supply valve is closed and said auxiliary fuel supply valve is opened, thereby shutting off fuel delivery from the main fuel tank system and initiating fuel delivery from said auxiliary fuel tank system, when said pneumatic switch is closed by actuation of the vehicle parking brake system to complete said electrical circuit, and said main fuel supply valve is opened and said auxiliary fuel supply valve is closed when the vehicle parking brake is released to cause air pressure to open said pneumatic switch as air pressure is supplied to the parking brake system to release the vehicle parking brakes.

7. The fuel tank switching apparatus of claim 1 wherein the motor vehicle parking brake system includes electrical parking brake actuation warning means, said fuel tank switching apparatus including:

at least said main fuel supply valve being closed when electrical power is applied thereto, at least said auxiliary fuel supply valve being opened when electrical power is applied thereto, and;

said automatic switching means comprising an electrical circuit supplying electrical power from the electrical parking brake actuation warning means to at least said main fuel supply valve and said auxiliary fuel supply valve, whereby;

said main fuel supply valve is closed and said auxiliary fuel supply valve is opened, thereby shutting off fuel delivery from the main fuel tank system and initiating fuel delivery from said auxiliary fuel tank system, when the vehicle parking brake system and the electrical parking brake actuation warning means is actuated to complete said electrical circuit, and said main fuel supply valve is opened and said auxiliary fuel supply valve is closed when the vehicle parking brake is released to cause the electrical parking brake actuation warning means to open.

8. The fuel tank switching apparatus of claim 1 including:

switching means providing for automatic switching of fuel delivery from said auxiliary fuel tank system to the main fuel tank system of the motor vehicle when said auxiliary fuel tank system is depleted of fuel.

9. The fuel tank switching apparatus of claim 8 including:

means providing for notification that said auxiliary fuel tank system is depleted of fuel.

10. The fuel tank switching apparatus of claim 9 wherein:

said means providing for notification that said auxiliary fuel tank system is depleted of fuel comprises a warning light actuated when said switching means providing for automatic switching of fuel delivery from said auxiliary fuel tank system to the main fuel tank system of the motor vehicle is activated.

11. In combination with a motor vehicle having at least a main fuel tank system, an engine fuel distribution system, and a parking brake system, a fuel tank switching apparatus comprising:

at least a main fuel supply valve providing for primary fuel supply from said main fuel tank system to said engine fuel distribution system of said motor vehicle, an auxiliary fuel tank system, and an auxiliary fuel supply valve providing auxiliary fuel supply from said auxiliary fuel tank system to said engine fuel distribution system of said motor vehicle, and;

automatic switching means communicating with said main fuel supply valve and said auxiliary fuel supply valve and controlled by operation of said vehicle parking brake system, with said automatic switching means closing said main fuel supply valve and opening said auxiliary fuel supply valve when said parking brake system is actuated, thereby causing stoppage of fuel delivery from the main fuel tank system and simultaneous initiation of fuel delivery from said auxiliary fuel tank system, and further opening said main fuel supply valve and closing said auxiliary fuel supply valve when said parking brake system is released, thereby causing stoppage of fuel delivery from said auxiliary fuel tank system and simultaneous initiation of fuel delivery from said main fuel tank system of said motor vehicle, whereby;

switching from said main fuel tank system to said auxiliary fuel tank system of said motor vehicle is accomplished automatically without intervention of a vehicle operator when said vehicle parking brake system is actuated, and reversed when said vehicle parking brake is released.

12. The motor vehicle and fuel tank switching apparatus combination of claim 11 including:

a main fuel return valve providing for return of unused primary fuel from said engine fuel distribution system to said main fuel tank system, and an auxiliary fuel return valve providing for return of unused auxiliary fuel from said engine fuel distribution system to said auxiliary fuel tank system.

13. The motor vehicle and fuel tank switching apparatus combination of claim 12 wherein:

said main fuel supply valve, auxiliary fuel supply valve, main fuel return valve, and auxiliary fuel return valve are each physically separate from one another.

14. The motor vehicle and fuel tank switching apparatus combination of claim 12 wherein:

said main fuel supply valve and said main fuel return valve each respectively have a larger capacity than said auxiliary fuel supply valve and said auxiliary fuel return valve, whereby fuel flow rate through said auxiliary fuel supply valve and said auxiliary fuel return valve is limited to supply sufficient fuel flow only for low power conditions.

15. The motor vehicle and fuel tank switching apparatus combination of claim 12 including:

check valves precluding fuel flow from said main fuel tank system to said auxiliary fuel tank system, and from said auxiliary fuel tank system to said main fuel tank system of said vehicle.

16. The motor vehicle and fuel tank switching apparatus combination of claim 11, wherein:

said motor vehicle parking brake system is pneumatically actuated;

said fuel tank switching apparatus includes a pneumatic switch communicating pneumatically with said vehicle parking brake system and electrically with at least salad main fuel supply valve and said auxiliary fuel supply valve;

at least said main fuel supply valve is closed when electrical power is applied thereto, at least said auxiliary fuel supply valve is opened when electrical power is applied thereto, and said pneumatic switch is closed when air pressure is released from said vehicle parking brake system to apply the vehicle parking brakes, and;

said automatic switching means comprises an electrical circuit supplying electrical power to at least said main fuel supply valve, said auxiliary fuel supply valve, and said pneumatic switch, whereby;

said main fuel supply valve is closed and said auxiliary fuel supply valve is opened, thereby shutting off fuel delivery from said main fuel tank system and initiating fuel delivery from said auxiliary fuel tank system, when said pneumatic switch is closed by actuation of said vehicle pneumatic parking brake system to complete said electrical circuit, and said main fuel supply valve is opened and said auxiliary fuel supply valve is closed when said vehicle parking brake is release to cause air pressure to open said pneumatic switch as air pressure is supplied to said vehicle pneumatic parking brake system to release the vehicle parking brakes.

17. The motor vehicle and fuel tank switching apparatus combination of claim 11, wherein:

said motor vehicle includes electrical parking brake actuation warning means;

at least said main fuel supply valve is closed when electrical power is applied thereto and at least said auxiliary fuel supply valve is opened when electrical power is applied thereto, and;

said automatic switching means comprises an electrical circuit supplying electrical power from said electrical parking brake actuation warning means to at least said main fuel supply valve and said auxiliary fuel supply valve, whereby;

said main fuel supply valve is closed and said auxiliary fuel supply valve is opened, thereby shutting off fuel delivery from said main fuel tank system and initiating fuel delivery from said auxiliary fuel tank system, when said vehicle parking brake system and said electrical parking brake actuation warning means is actuated to complete said electrical circuit, and said main fuel supply valve is opened and said auxiliary fuel supply valve is closed when said vehicle parking brake is released to cause said electrical parking brake actuation warning means to open.

18. The motor vehicle and fuel tank switching apparatus combination of claim 11 including:

switching means providing for automatic switching of fuel delivery from said auxiliary fuel tank system to said main fuel tank system of said motor vehicle when said auxiliary fuel tank system is depleted of fuel.

19. The motor vehicle and fuel combination of claim 18 including:

means providing for notification that said auxiliary fuel tank system is depleted of fuel.

20. The motor vehicle and fuel tank switching apparatus combination of claim 19 wherein:

said means providing for notification that said auxiliary fuel tank system is depleted of fuel comprises a warning light actuated when said switching means providing for automatic switching of fuel delivery from said auxiliary fuel tank system to said main fuel tank system of said motor vehicle is activated.

* * * * *